United States Patent [19]

Bradshaw et al.

[11] Patent Number: 4,927,661

[45] Date of Patent: May 22, 1990

[54] HEAT PRODUCT

[75] Inventors: Noel J. Bradshaw, Sharnbrook; David Hughes, Rushden, both of United Kingdom

[73] Assignee: Unilever Patent Holdings, B.V., Rotterdam, Netherlands

[21] Appl. No.: 767,028

[22] Filed: Aug. 19, 1985

[30] Foreign Application Priority Data

Aug. 17, 1984 [GB] United Kingdom ................ 8420946

[51] Int. Cl.$^5$ ...................... A23L 1/314; A23L 1/315; A23L 1/317
[52] U.S. Cl. .................................. 426/641; 426/513; 426/644; 426/646
[58] Field of Search ............... 426/641, 646, 652, 656, 426/657, 513, 644

[56] References Cited

U.S. PATENT DOCUMENTS

| 3,253,931 | 5/1966 | Coleman et al. | |
| 3,793,466 | 2/1974 | Kawkins et al. | |
| 3,852,487 | 12/1974 | Van Werven et al. | 426/388 X |
| 4,057,650 | 11/1977 | Keszler | 426/646 X |
| 4,107,337 | 8/1978 | Deppner, Jr. | 426/266 |
| 4,210,677 | 7/1980 | Huffman | 426/272 |
| 4,264,633 | 4/1981 | Bradshaw | 426/264 |

FOREIGN PATENT DOCUMENTS

| 1236311 | 3/1967 | Fed. Rep. of Germany . |
| 2096308 | 11/1972 | France . |
| 2381479 | 9/1978 | France . |
| 952204 | 3/1964 | United Kingdom . |
| 2095090 | 9/1982 | United Kingdom . |

Primary Examiner—Arthur L. Corbin
Attorney, Agent, or Firm—Cushman, Darby & Cushman

[57] ABSTRACT

A two-phase meat product comprising 20–90 wt % of a texture imparting phase consisting of aligned flat meat slices, having a thickness of 0.5–6 mm, and 80–10 wt % of a finely dispersed succulence imparting phase, which product exhibits a parallel arrangement of its constituent phases, so that appropriate planes of orientation are formed to give sequential breakdown of the product in the mouth upon consumption. Also a process of producing these products is disclosed.

15 Claims, No Drawings

HEAT PRODUCT

BACKGROUND OF THE INVENTION

The present invention relates to a two-phase meat product and to a process for preparing such a two-phase meat product.

High quality meat has a relatively high content of muscle tissue, low fat content or fat which is easily removed, and connective tissue or gristle of such a kind or in such a proportion, that this meat can be cooked by simple methods to give highly desirable products with a tender and juicy texture. Many qualities and/or cuts of meat, however, contain connective tissue of such a kind or in such a proportion that the meat is tough to eat, unless the connective tissue is suitably tenderized, or wholly or partly removed prior to processing.

It has, therefore, been proposed to convert the cheaper meat with its associated fat and connective tissue by so-called reassembling and reforming techniques into meat products which do not exhibit the poor eating characteristics associated with the cheaper, low quality meat. In these processes generally the natural structure of the meat is extensively damaged by finely comminuting the meat or flaking it with conventional equipment and the comminute produced can be restructured into products which, on cooking, are much more palatable and tender than the original meat when cooked. However, such products lack the natural appearance of meat and, moreover, their eating characteristics are very often significantly different from natural meat.

Up till now it has always been thought that the fibrous nature of meat upon consumption had to be attributed to the muscle fibres present, hence the suggestion to incorporate fibrous or other relatively hard materials, such as vegetable protein fibres, cooked meat shreds or other meat connective tissue into reassembled meat.

Previous attempts to simulate the texture and succulence of good cuts of natural meat have led to products with an acceptable texture, but insufficient succulence, or vice versa, in other words, the one quality was reached only at the cost of the other. In extensive experiments a meat product has now been developed, exhibiting the proper balance between a good texture and a good succulence. This meat product is obtained by providing two phases, viz. one phase, consisting of meat slices, imparting the correct texture and a second phase imparting sufficient succulence, the final product exhibiting a parallel alignment of its constituent phases.

With regard to the texture imparting phase, it has now been found that fibrosity does not relate to fibres solely, but that the texture impression during the eating of meat is significantly influenced by the macrostructure of the meat, in particular by the alignment of structural elements. In order to produce a reassembled, reformed or restructured meat product which upon consumption closely resembles natural meat, it has been found necessary to provide a product with a structure having internal, preferential planes of weakness. This product upon chewing (consumption) breaks down in a defined temporal way and according to a pattern, which gives rise to a strong, meat-like impression, producing structural elements of size and shape comparable to tertiary bundles of muscle fibres. The meat product according to the present invention hence should exhibit "built-in" orderly planes of weakness in order to arrive at a certain temporal sequence of breakdown, which derives from the preferential fracture of the meat along these planes of weakness. This sequential breakdown will initially produce a small number of larger particles (at least the size of tertiary bundles) and subsequently a larger number of anisotropic smaller particles.

With regard to the succulence imparting phase, the function of this phase in the final product is to reduce the losses of juices during cooking and to provide their release during consumption. This function is realized by providing as the succulence imparting phase a finely dispersed phase, comprising fat, water and a binding agent, which preferably is a proteinaceous binding agent.

SUMMARY OF THE INVENTION

Accordingly, the present invention relates to a two-phase meat product, comprising (a) from 20 to 90 percent by weight of a texture imparting phase, consisting of aligned, flat meat slices, having a thickness of from 0.5 to 6 mm, and (b) from 80 to 10 percent by weight of a finely dispersed, succulence imparting phase, comprising fat, water and a binding agent, said two-phase meat product exhibiting a parallel arrangement of its constituent phases.

Dependent on the type of meat raw material used, the process used in the manufacture of the product and on the preservation and the environment of the product, the relative ratio between the texture imparting phase and the succulence imparting phase may vary rather widely. For beef based products, for instance, a preferred ratio is from 30 to 70 percent by weight of the texture imparting phase and from 70 to 30 percent by weight of the succulence imparting phase; for poultry and pork based products a preferred ratio is from 20 to 80 percent by weight of the texture imparting phase and from 80 to 20 percent by weight of the succulence imparting phase. For heat-sterilisable products in general the amount of texture imparting phase should be increased in comparison to fresh, chilled or frozen products. If during the manufacture of the product part of the texture imparting phase is damaged, provision should be made in the relative ratio of the two phases to compensate for this.

By the term "meat" is understood throughout this specification and the appended claims beef, pork, or other types of meat from mammals, poultry meat, like chicken and turkey meat. The meat can be fresh, at least partially cooked or cured, and can have been subjected to pretreatments, like tenderizing, ageing, injecting, marinading, and the like.

With regard to the texture imparting phase it has been found that aligned, flat meat slices impart the planes of weakness to the two-phase meat product and hence they constitute the structural backbone of the product, whereas the succulence imparting phase, apart from giving the two-phase meat product its required succulence, also separates the slices of meat, thus also contributing to the presence of the planes of weakness. Moreover, the succulence imparting phase can be used as the carrier for any required additives, like flavouring agents, spices, and the like, from which succulence imparting phase a controlled release of the flavours can take place. The succulence imparting phase may additionally serve as a kind of adhesive, to "glue" the flat slices or flakes of meat together.

The flat meat slices are preferably obtained by using normal slicing machinery, since in this way a good control of slice dimensions is obtained. The alignment of the constituent phases is essential and the plane of alignment is dependent on the characteristics of the product required. Preferably the alignment is parallel and can be horizontal, vertical, or concentric, depending on the nature of the species of meat to be simulated and the characteristics of the product required. The degree of alignment will be dependent on the type of process used for the manufacture of the two-phase meat product, the major intent of the process being to prevent randomization of the constituents of both phases.

The alignment of the constituent phases is essential to impart to the two-phase meat product a strong meatlike appearance, but also for its eating characteristics. Dependent on the type of alignment required, different machinery and methods can be used to obtain alignment, such as extrusion, moulding, layering, folding, pressing, and the like, but it is very important that a maximum alignment of the constituents of both phases is obtained. Alignment can be enhanced by a variety of methods, like the design or shape of the extrusion nozzle.

In general, the thickness of the flat meat slices may vary from 0.5 mm to about 6 mm, preferably from about 1 mm to about 3 mm. With this thickness of the slices the right morphology is obtained to produce the required, correct structure. The meat slices for red meats will usually have a surface area of between about 100 cm$^2$ and about 200 cm$^2$; for chicken meat the surface area can be smaller.

The succulence imparting phase is a finely dispersed phase comprising fat, water and a binding agent, which preferably is a proteinaceous binding agent. The fat may be of vegetable or animal origin or may be a synthetic fat. It may be a single fat or fat fraction or a mixture of fats and/or fat fractions. Also an amount of fat having a high content of poly-unsaturated fatty acid radicals may be used. Part of the fat can be replaced by compounds having properties which are functionally similar to those of triglycerides. For example, higher fatty acid esters of mono- and disaccharides, fatty alkyl ether derivatives of glycerol, esters of fatty alcohols and poly-carboxylic acids, waxes and microcrystalline cellulose can be used for replacing part of the fat. The binding agent preferably is a proteinaceous binding agent, such as ground meat, soya protein, sodium caseinate, and the like, but also carbohydrate material, like starches, alginates, cellulose derivatives and the like, can be used.

The two-phase meat product can be presented in any suitable size or shape and is stable and suitable for preserving by chilling, freezing, canning, drying and the like. If the two-phase meat product is produced by extrusion, then the plane of cutting the final product is perpendicular to the main axis of the parallel alignment of the constituent phases. The two-phase meat product can also be further processed, for example the product can be coated with bat-ter and bread crumbs, fat, pastry and other components.

The present invention also relates to a process of preparing a two-phase beef or pork product, in which (a) beef or pork meat is sliced into slices having a thickness of from 0.5 mm to about 6 mm, preferably of from 1 mm to 3 mm, forming a texture imparting phase;

(b) a finely dispersed succulence imparting phase, comprising fat, water and a binding agent is formed;

(c) the texture imparting phase and the succulence imparting phase are gently combined;

(d) the mixture obtained is subjected to an alignment treatment, and (e) the aligned mixture is brought into the required form and shape for consumption.

Generally from 20 to 90 percent by weight of texture imparting phase is combined with 80 to 10 percent by weight of succulence imparting phase. In the case of beef, preferably from 30 to 70 percent by weight of beef-based, texture imparting phase is combined with 70 to 30 percent by weight of beef-based, succulence imparting phase and in the case of pork meat preferably from 20 to 80 percent by weight of pork meat-based texture imparting phase is combined with from 80 to 20 percent by weight of pork meat-based succulence imparting phase.

The succulence imparting phase is preferably obtained by comminuting fatty meat, and the resultant comminute is mixed with sodium chloride, water and optional additives, like flavouring agents, herbs, spices, colouring agents and the like.

The alignment treatment is carried out by passing the mixture or texture imparting phase and succulence imparting phase through machinery which imparts the highest possible degree of alignment to the constituents of both phases.

The invention also relates to a process of preparing a two-phase poultry meat product in which (a) poultry meat is sliced into slices having a thickness of from 0.5 mm to 6 mm, preferably from 1 mm to 3 mm, forming a texture imparting phase;

(b) a finely dispersed succulence imparting phase, comprising fat, water and a binding agent is formed;

(c) the texture imparting phase and the succulence imparting phase are gently combined, preferably in a weight ratio of from 20 to 80 percent by weight of texture imparting phase and from 80 to 20 percent by weight of succulence imparting phase;

(d) the mixture obtained is subjected to an alignment treatment, and (e) the aligned mixture is brought into the required form and shape for consumption.

In another embodiment of the process according to the invention the succulence imparting phase is prepared by dispersing fat and water, adding salt and further additives, like flavouring agents, herbs and spices, colouring agents, antioxidants and the like, and subsequently adding the binding agent, which may be ground meat, soy protein, sodium caseinate, starches, alginates, cellulose derivatives or mixtures of any one or more of these.

The invention is now illustrated by the following examples which in no way are to be construed as limiting the scope of the present invention.

DESCRIPTION OF THE PREFERRED EMBODIMENTS

EXAMPLE I

Lean beef, having a fat content of 5 percent by weight, was tempered to a core temperature of $-4°$ C. and subsequently sliced by means of a high speed slicer into slices having a thickness of from 2 to 3 mm. These slices constituted the texture imparting phase of the two-phase meat product to be prepared.

Fatty beef with a fat content of 30 percent by weight was tempered to a core temperature of $-4°$ C. and then finely comminuted in an Urschel Comitrol (Registered Trademark) using the 120 head. The obtained comminute was subsequently mixed in a high shear mixer with 0.7 percent by weight of sodium chloride, 5 percent by weight of water and 1 percent by weight of flavouring substances and spices (all weight percentages based on the weight of the total two-phase meat product). A finely dispersed material to be used as the succulence imparting phase was obtained.

Equal quantities by weight of the slices and the finely dispersed phase were then blended together and the obtained blend was extruded, using a vacuum extruder (Handtmann Type VF-20), through a die to give a shaped log of meat. The extruded logs were cut into lengths, frozen to −4° C., tempered at this temperature and then pressed to give a uniform shape. Finally they were sliced, perpendicular to the direction of extrusion to the required thickness to form steaks.

From this example it is clear, that with regard to the succulence imparting phase cheap meat with high fat content is used, so that in practicing the present invention a cheap and poor quality meat is upgraded into a high quality meat product. It is essential that the combination of the texture imparting phase and the succulence imparting phase is carried out very gently, so that the slices of meat are not broken down.

During the gentle mixing often some natural rough alignment of the meat slices or flakes already occurs, but the final alignment of the meat slices is carried out in a suitable device to effect the parallel alignment, e.g. in an extruder. The extrusion is then effected in such a way that the mixture of the two phases is not broken down, but that during the extrusion the meat slices are forced to arrange themselves in a parallel alignment, so as to yield the final, required two-phase meat product.

It will be clear that the shaped logs of meat finally obtained can be sliced to steak dimensions, but also to larger roasting joints, to cubes or chunks or other shapes and sizes as required.

EXAMPLE II 53 percent by weight (all percentages by weight of the ingredients in this example are based on the weight of the final product) of blocks of frozen pork meat, having a fat content of 20 percent by weight, were tempered for 48 hours at −4° C. and further conditioned for 12 hours at 1° C. This tempered, conditioned meat was then sliced, using a high speed slicer, into slices with a thickness of from 2 to 3 mm.

35 percent by weight of pork meat, having a fat content of 30 percent by weight, were tempered for 48 hours at −4° C. This tempered, conditioned pork meat was finely comminuted in an Urschel Comitrol (Registered Trade Mark), using the 240 head. The obtained comminute was then mixed in a high shear mixer with 10 percent by weight of water, 1 percent by weight of sodium chloride and 1 percent by weight of flavouring substances and spices. A finely dispersed phase, to be used as the succulence imparting phase was obtained.

The slices and the finely dispersed phase obtained were then very gently mixed, using a two paddle mixer and the mixture thus obtained was extruded, using a vacuum extruder (Handtmann, Type VF-20), through a die to give a shaped log of meat. This log of meat was further processed as described in Example I, yielding an excellent two-phase, pork steak product.

EXAMPLE III 60 percent by weight (all percentages by weight of the ingredients in this example are based on the weight of the final product) of manufacturing white chicken meat, having a fat content of 5 percent by weight, were tempered to a core temperature of −4° C. This tempered chicken meat was then sliced, using a high speed slicer, into slices with a thickness of from 2 to 3 mm. 15 percent by weight of red chicken meat and 5 percent by weight chicken skin were finely comminuted in an Urschel Comitrol (Registered Trade Mark), using the 060 head. The obtained comminute was then mixed in a high shear mixer with 10 percent by weight of chicken fat, 5 percent by weight of water, 0.8 percent by weight of sodium chloride and 4.2 percent by weight flavouring substances and spices. The obtained finely dispersed phase was gently mixed with the slices of chicken meat and the mixture thus obtained was formed into 100 gram patties, using a Square Minimat forming machine. The patties were subsequently frozen and packed.

EXAMPLE IV 78 percent by weight (all percentages by weight of the ingredients in this example are based on the weight of the final product) of frozen beef, having a fat content of 10 percent by weight, were tempered until a core temperature of −4° C. had been reached. This tempered beef was then sliced, using a high speed slicer, into slices with a thickness of 4 mm.

10 percent by weight of beef, having a fat content of 30 percent by weight, were tempered until a core temperature of −4° C. had been reached. This tempered beef was then finely comminuted in an Urschel Comitrol (Registered Trade Mark), using the 120 head. The obtained comminute was then mixed in a high shear mixer with 10 percent by weight of water, 0.8 percent by weight of sodium chloride and 1.2 percent by weight of flavouring substances and spices. A finely dispersed phase was obtained, to be used as the succulence imparting phase.

The slices and the finely dispersed phase were gently mixed, and the mixture thus obtained was extruded, using a vacuum extruder (Handtmann, Type VF-20), through a die to give a shaped log of meat, which was further processed as described in Example I, but sliced into steaks with a thickness of 17 mm. These steaks were packed in 450 ml cans with an aqueous gravy and the cans were autoclaved for 45 minutes at 120° C. An ambient stable, heat-sterilized, two-phase meat Product was obtained.

EXAMPLE V 70 percent by weight (all percentages by weight of the ingredients in this example are base on the weight of the final product) of manufacturing white chicken meat, having a fat content of 5 percent by weight, were tempered to a core temperature of −4° C. This tempered chicken meat was then sliced, using a high speed slicer, into slices with a thickness of from 2 to 3 mm.

30 percent by weight of a succulence imparting phase were prepared, consisting of 14 percent by weight of water, 2 percent by weight of salt and flavouring substances, 10 percent by weight of hardened palm oil (melting point 30° C.), 3 percent by weight of egg albumin and 1 percent by weight of carboxymethyl cellulose (Cellucol M-450; Trademark).

This succulence imparting phase was prepared in a suitable vessel, using a high shear mixing machine e.g. a Silverson mixer, by dispersing the fat having a temperature of 20° C. and the water having a temperature of 50° C., then whilst continuously mixing the remainder of the ingredients were added in the following sequence first the salt and the flavouring substances, then the protein and finally the carboxymethyl cellulose. The mixing was continued until a homogeneous dispersion was formed, which was subsequently cooled until the required viscosity at 10° C. had been reached. The obtained succulence imparting phase was then gently mixed with the slices of chicken meat and the mixture thus obtained was formed into 100 gram patties, using a Square Minimat forming machine during which alignment took place. The patties were subsequently frozen and packed. Example VI 50 percent by weight (all percentages by weight of the ingredients in this example are based on the weight of the final product) of raw fresh lean pork shoulder with a fat content of 10 percent by weight was sliced into slices of 2 mm thickness. 31 percent by weight of fresh pork meat, having a fat content of 20 percent by weight, was minced through a Hobart mincing machine using a 2 mm plate. The obtained minced meat was mixed with 10 percent by weight of water, 0.8 percent by weight of sodium chloride and 8.2 percent by weight of other ingredients including of flavouring substances and spices. A finely dispersed phase, to be used as the succulence imparting phase was obtained. The slices and the finely dispersed phase obtained were then very gently mixed, using a two paddle mixer and the mixture thus obtained was extruded, using a vacuum extruder (Handtmann, Type VF-20) through a die to give a shaped log of meat. This log of meat was further processed as described in Example I, yielding an outstanding two-phase pork steak product.

We claim:

1. A two-phase meat product, comprising (a) from 20 to 90 percent by weight of a texture imparting phase, consisting of aligned, flat meat slices having a thickness of from 0.5 mm to 6 mm, and (b) from 80 to 10 percent by weight of a finely dispersed succulence imparting phase, comprising fat, water and a binding agent, said two-phase meat product exhibiting a parallel arrangement of its constituent phases.

2. A two-phase beef product according to claim 1, conprising (a) from 30 to 70 percent by weight of a texture imparting phase, consisting of aligned, flat beef slices having a thickness of from 0.5 mm to 6 mm, and (b) from 70 to 30 percent by weight of a finely dispersed succulence imparting phase, comprising fat, water and a binding agent, said two-phase beef product exhibiting a parallel arrangement of its constituent phases.

3. A two-phase poultry or pork product according to claim 1, comprising (a) from 20 to 80 percent by weight of a texture imparting phase, consisting of aligned flat poultry or pork slices having a thickness of from 0.5 mm to 6 mm, and (b) from 80 to 20 percent by weight of a finely dispersed succulence imparting phase, comprising fat, water and a binding agent, said two-phase poultry or pork product exhibiting a parallel alignment of its constituent phases.

4. A two-phase meat product according to claim 1, in which the aligned flat meat slices have a thickness of from 1 mm to 3 mm.

5. A two-phase meat product according to claim 1, in which the binding agent is a proteinaceous binding agent.

6. A two-phase meat product according to claim 5, in which the proteinaceous binding agent is meat which has been comminuted, preferably by flaking, and subsequently mixed under high shear conditions with salt, water and further optional additives.

7. A process of preparing a two-phase beef, pork or poultry meat product, according to claim 1, comprising the steps of:
   (a) slicing beef, pork or poultry into slices having a thickness of from 0.5 mm to 6 mm, forming a texture imparting phase;
   (b) forming a finely dispersed succulence imparting phase, comprising fat, water and a binding agent;
   (c) gently combining the texture imparting phase and the succulence imparting phase;
   (d) subjecting the mixture obtained to an alignment treatment, and
   (e) bringing the aligned mixture into the required form and shape for consumption.

8. A process according to claim 7, in which the beef, pork or poultry slices have a thickness of from 1 mm to 3 mm.

9. A process according to claim 7, in which from 20 to 90 percent by weight of texture imparting phase is combined with from 80 to 10 percent by weight of succulence imparting phase.

10. A process according to claim 9, in which from 30 to 70 percent by weight of beef-based, texture imparting phase is combined with from 70 to 30 percent by weight of succulence imparting phase.

11. A process according to claim 9, in which from 20 to 80 percent by weight of pork or poultry meat-based, texture imparting phase is combined with from 80 to 20 percent by weight of succulence imparting phase.

12. A process according to claim 7, in which the succulence imparting phase is obtained by comminuting fatty meat and the resultant comminute is mixed with sodium chloride, water and optional additives.

13. A process according to claim 7, in which the succulence imparting phase is obtained by comminuting tempered fatty meat with a flaking device and the resultant flakes are mixed with sodium chloride, water and optional additives under high shear conditions.

14. A process of preparing a two-phase meat product, according to claim 7, in which the succulence imparting phase is prepared by dispersing fat and water, adding salt and further additions and subsequently adding the binding agent selected from the group consisting of ground meat, soy protein, sodium caseinate, starches, alginates, cellulose derivatives, or mixtures thereof.

15. A process of preparing a two-phase meat product according to claim 7, in which the alignment treatment is extrusion.

* * * * *